(12) United States Patent
Syrovy

(10) Patent No.: US 8,206,106 B2
(45) Date of Patent: Jun. 26, 2012

(54) OSCILLATING WINDMILL

(75) Inventor: George Syrovy, Centerville, MA (US)

(73) Assignee: Windflo, LLC, Bonita Springs, FL (US)

( * ) Notice: Subject to any disclaimer, the term of this patent is extended or adjusted under 35 U.S.C. 154(b) by 1129 days.

(21) Appl. No.: 11/940,902

(22) Filed: Nov. 15, 2007

(65) Prior Publication Data

US 2008/0304965 A1 Dec. 11, 2008

Related U.S. Application Data

(60) Provisional application No. 60/947,049, filed on Jun. 29, 2007, provisional application No. 60/866,127, filed on Nov. 16, 2006.

(51) Int. Cl.
*F03D 5/06* (2006.01)
(52) U.S. Cl. ......................................................... 416/83
(58) Field of Classification Search .................... 416/79, 416/81, 82, 83, 98, 100; 415/3.1, 4.4, 906, 415/907

See application file for complete search history.

(56) References Cited

U.S. PATENT DOCUMENTS

| | | | |
|---|---|---|---|
| 2,023 A | 3/1841 | Hobday et al. | |
| 589,530 A | 9/1897 | Knowlton | |
| 905,320 A * | 12/1908 | Isham | 416/83 |
| 928,097 A | 7/1909 | Barker | |
| 1,265,137 A | 5/1918 | Tayloe | |
| 1,352,952 A | 9/1920 | Gracey | |
| 1,915,689 A | 6/1933 | Moore | |
| 3,810,712 A | 5/1974 | Hillman | |
| 3,899,268 A | 8/1975 | Hillman | |
| 3,987,987 A | 10/1976 | Payne et al. | |
| 3,992,125 A | 11/1976 | Schilling | |
| 3,995,170 A | 11/1976 | Graybill | |
| 4,024,409 A | 5/1977 | Payne | |

(Continued)

FOREIGN PATENT DOCUMENTS

FR 2574489 A1 * 6/1986

(Continued)

OTHER PUBLICATIONS

FR2,574,489A1 Machine Translation. Accessed EPO website Jun. 23, 2011. 2 pages.*

*Primary Examiner* — Richard Edgar
(74) *Attorney, Agent, or Firm* — Polster, Lieder, Woodruff & Lucchesi, LC

(57) ABSTRACT

In a preferred embodiment, pairs of oscillating wind paddles are mounted in the lee of a wind turbine of the lift type. An oscillating wind paddle assembly has an upper pair of paddles moving between a first position at substantially right angles to the direction of wind and a second position substantially parallel to the direction of the wind and mounted on arms extending to either side of a shaft to which they are connected through a one-way clutch, and a lower pair of paddles moving between a position at substantially right angles to the direction of the wind and a second position substantially parallel to the direction of the wind and mounted on arms extending to either side of the same shaft to which they are connected through a one-way clutch, one of the paddles being a drive paddle and the other a recovery paddle, the two pairs of paddles being out of phase with respect to one another.

17 Claims, 12 Drawing Sheets

U.S. PATENT DOCUMENTS

| | | | |
|---|---|---|---|
| 4,093,035 A | 6/1978 | Fletcher | |
| 4,184,084 A | 1/1980 | Crehore | |
| 4,191,507 A | 3/1980 | DeBerg | |
| 4,218,183 A | 8/1980 | Dall-Winther | |
| 4,261,687 A | 4/1981 | Gerberick | |
| 4,303,835 A | 12/1981 | Bair | |
| 4,355,956 A | 10/1982 | Ringrose et al. | |
| 4,468,169 A | 8/1984 | Williams | |
| 4,527,950 A | 7/1985 | Biscomb | |
| 4,566,853 A | 1/1986 | Likitanupak | |
| 4,589,344 A | 5/1986 | Davison | |
| 4,609,827 A | 9/1986 | Nepple | |
| 4,618,312 A | 10/1986 | Williams | |
| 4,681,512 A | 7/1987 | Barnard | |
| 4,730,119 A | 3/1988 | Biscomb | |
| 4,822,239 A | 4/1989 | Tsipov | |
| 5,083,902 A | 1/1992 | Rhodes | |
| 5,126,584 A | 6/1992 | Ouellet | |
| 5,131,805 A | 7/1992 | Stevenson | |
| 5,134,305 A | 7/1992 | Senehi | |
| 5,254,876 A | 10/1993 | Hickey | |
| 5,324,169 A * | 6/1994 | Brown et al. | 416/83 |
| 5,758,911 A | 6/1998 | Gerhardt | |
| 6,000,907 A * | 12/1999 | Bic | 416/17 |
| 6,016,014 A | 1/2000 | Grigorescu et al. | |
| 6,153,944 A | 11/2000 | Clark | |
| 6,283,710 B1 | 9/2001 | Biscomb | |
| 6,537,018 B2 | 3/2003 | Streetman et al. | |
| 6,616,402 B2 | 9/2003 | Selsam | |
| 6,619,921 B1 | 9/2003 | Lindhorn | |
| 6,672,522 B2 | 1/2004 | Lee et al. | |
| 6,682,296 B1 | 1/2004 | Jonsson et al. | |
| 6,682,302 B2 | 1/2004 | Noble | |
| 6,749,393 B2 | 6/2004 | Sosonkina | |
| 6,779,966 B2 | 8/2004 | Smith, II | |
| 6,809,430 B2 | 10/2004 | Diederich | |
| 6,840,738 B1 | 1/2005 | Swanberg | |
| 6,857,846 B2 | 2/2005 | Miller | |
| 6,921,986 B2 | 7/2005 | Bayer | |
| 6,929,450 B2 | 8/2005 | Noble | |
| 7,040,858 B2 | 5/2006 | Suzuki | |
| 7,045,702 B2 | 5/2006 | Kashyap | |
| 7,071,578 B1 | 7/2006 | Shibata et al. | |
| 7,075,191 B2 | 7/2006 | Davison | |
| 7,084,520 B2 | 8/2006 | Zambrano et al. | |
| 7,084,523 B2 | 8/2006 | Noguchi | |

FOREIGN PATENT DOCUMENTS

| | | |
|---|---|---|
| JP | 52-110349 A | 9/1977 |
| WO | WO 9737124 A1 * | 10/1997 |
| WO | 2006093790 | 9/2006 |

* cited by examiner

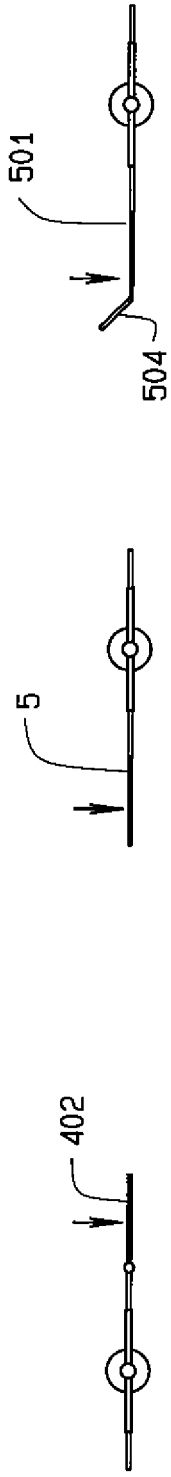
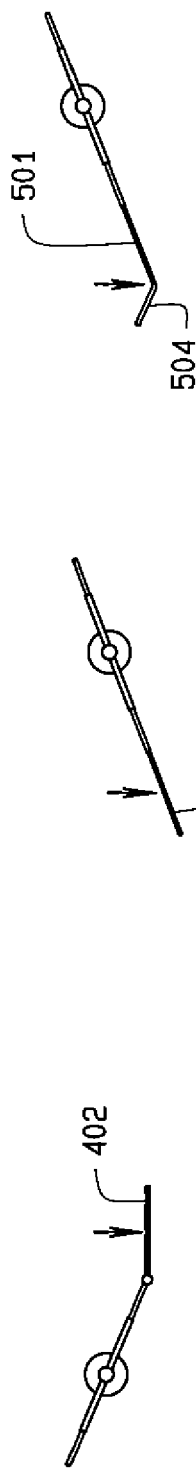
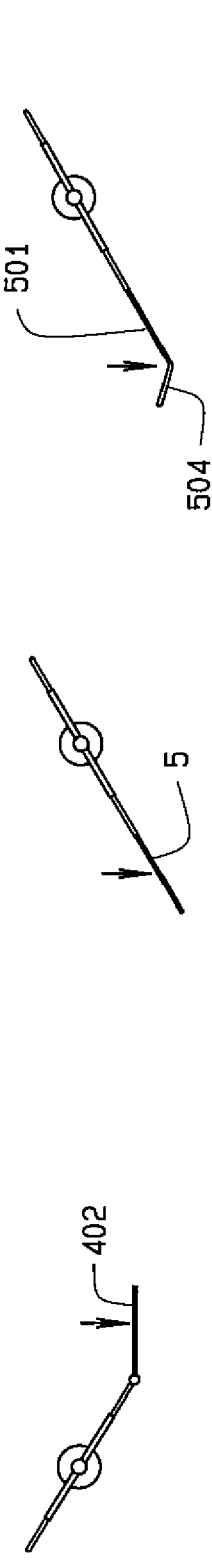

OSCILLATING WINDMILL

CROSS-REFERENCE TO RELATED APPLICATIONS

This application claims priority to U.S. Provisional Application No. 60/947,049 filed Jun. 29, 2007 and No. 60/866,127 filed Nov. 16, 2006, the disclosures of which patent applications are incorporated herein by reference.

STATEMENT REGARDING FEDERALLY SPONSORED RESEARCH

Not Applicable.

BACKGROUND OF THE INVENTION

Wind mills or wind motors on a vertical axis have been known for a long time, see GRACEY U.S. Pat. No. 1,352,952, and MOORE U.S. Pat. No. 1,915,689. Means moving vanes or paddles from a position substantially at right angles to the direction of the wind, to a position at which they are substantially parallel to the wind are well known; see MOORE, supra, and BAIR U.S. Pat. No. 4,303,835. The object in the various prior art references has been to provide continuous rotation of a shaft, see LINDHORN U.S. Pat. No. 6,619,921, even when the windmill itself is capable of being driven in a reverse direction, see OUELLET U.S. Pat. No. 5,126,584.

An excellent discussion of the prior art is set out in WO 2006/093790, published 8 Sep. 2006, incorporated by reference herein. "The windfin articulated wind-powered generator" of that applications uses as its driving force a lift force to produce a flapping motion. The present invention utilizes a drag force.

In the windmill of the present invention, the vanes, panels or paddles are designed to oscillate, going through on the order of 120° for a hinged type to 80° for a non-hinged type with flaps, and reversing, occupying a great deal less space than the conventional windmill. The windmill of this invention can be used in combination with the usual windmill of the lift type, which rotates on a horizontal axis, the sort of windmill now used extensively in windmill farms, for the generation of electricity. The latter windmills occupy a large amount of space. The panels or rotors of these windmills commonly describe a circle hundreds of feet in diameter, and the closest placement of adjacent windmills or turbines is recommended to be the length of at least five times the diameter of the wind turbine's rotor, so that the adjacent wind turbines in the array are often placed at a distance of a quarter of a mile to half a mile, so that the air stream has time to "recover".

BRIEF SUMMARY OF THE INVENTION

In accordance with this invention generally stated, an oscillating windmill is provided that, in its most elementary form, consists of vanes or paddles positioned at opposite ends of a horizontal rod connected at its center to a vertical shaft driven by the paddles alternately clockwise and counterclockwise, or, utilizing a one-way clutch and incremental segments, rotating in one direction. The paddle on one end of the rod is oriented to catch wind while the paddle in the other end is oriented to present the least surface to the wind, and means are provided for reversing the orientation of the paddles so that the rod is driven in the other direction when it has rotated through an arc sufficient to rotate the vertical shaft enough to accomplish useful work, but not through a full 180° if the windmill is to operate efficiently. Preferably, the vanes move the rod through no more than 120°, that is, 60° from a centerline.

For generating electricity, at least two pairs of paddles are preferably employed, one above the other but connected by one-way clutches to the vertical shaft. Preferably upper and lower pairs of paddles are oriented 180° apart, and oppositely disposed so that when a driving paddle of the upper assembly is engaging the shaft, the recovery paddle of the other paddle assembly is restoring the driving paddle with which it is associated to a beginning position.

In a preferred embodiment, the oscillating windmill just described, can be combined with a windmill of the lift type rotating on a horizontal axis, the shaft of the oscillating windmill being mechanically connected with a generator connected electrically to the generator of the lift type windmill.

BRIEF DESCRIPTION OF THE SEVERAL VIEWS OF THE DRAWINGS

In the accompanying drawings which form part of the specification:

FIGS. 8A1-8C3 are a somewhat diagramatic illustrations of the amplitude range comparisons and drag force leverages of three (3) types of paddle;

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

As various changes could be made in the above constructions without departing from the scope of the invention, it is intended that all matter contained in the above description or shown in the accompanying drawings shall be interpreted as illustrative and not in a limiting sense.

Figure 1:
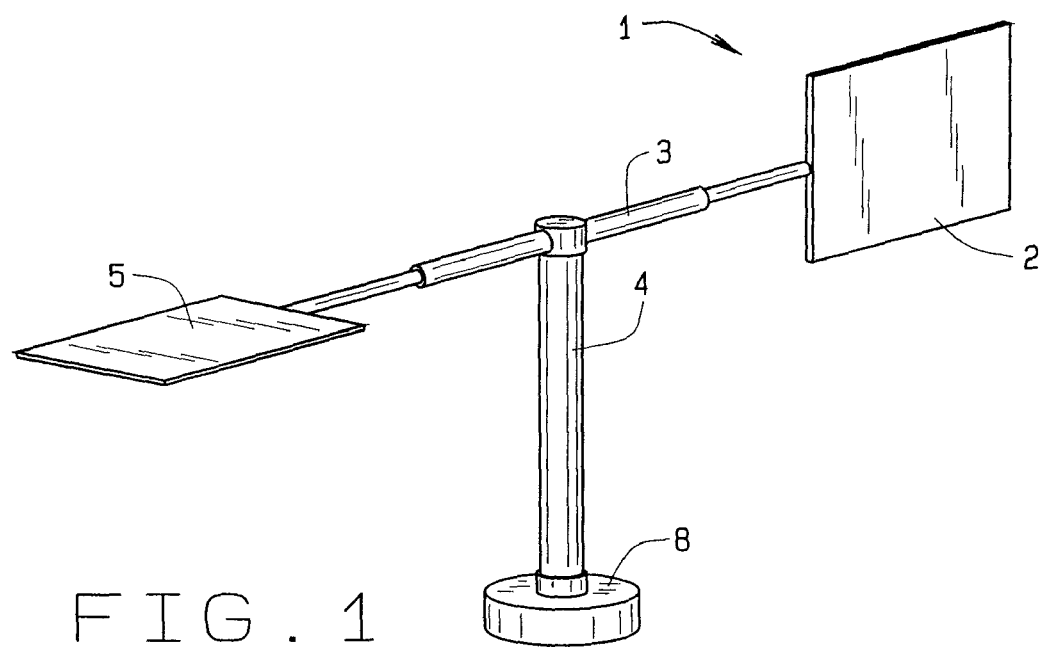
FIG. 1 is a view in perspective of a single partially rotated wind paddle.

Referring to FIG. 1, reference number 1 indicates a single partially rotating wind paddle system of this invention. One paddle 2 is shown as being oriented perpendicularly to the direction of wind blowing toward the drawing. The paddle 2 is mounted at the end of an arm 3, connected to a shaft 4. The other end of the arm 3 is connected to a paddle 5. In FIG. 1, the paddle 5 is shown as oriented parallel to the direction of the wind, so as to present the smallest possible wind profile. Accordingly, the paddle 2 is being driven in a direction away from the viewer, while the paddle 5 is being driven in a direction toward the viewer. When the paddle 2 has reached a certain position angularly with respect to the shaft 4, it is flipped 90 degrees to a position that is parallel with the wind, while the paddle 5 is flipped to the position in which it is perpendicular to the wind direction, and the cycle is then repeated, all as illustrated in FIGS. 2A-J. The shaft 4 passes through a generator housing 8 of a generator, as illustrated in FIG. 3, except that, unlike the device of FIG. 3 in which the direction of the power stroke is always in one direction of rotation, in the embodiment of FIG. 1, an intermediate gear arrangement is required when the direction of rotation is reversed, to drive the generator in one direction.

Figure 3:
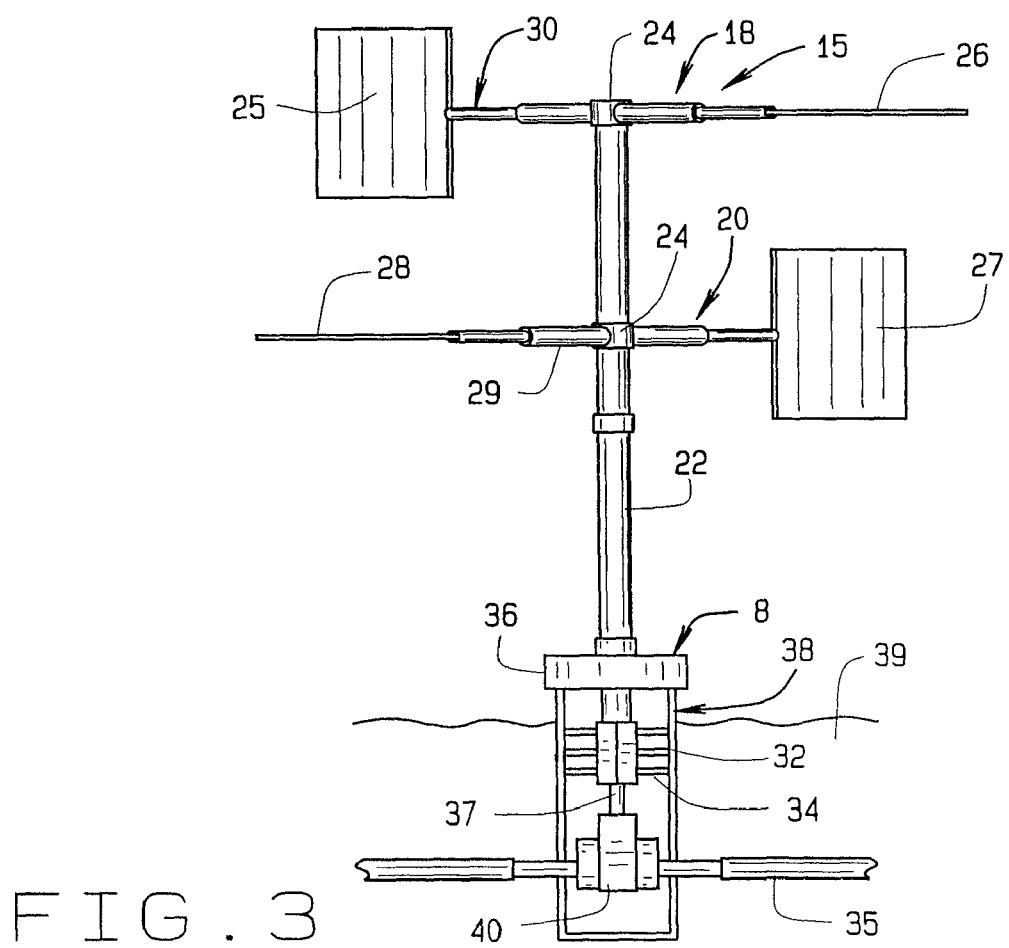
FIG. 3 is a second embodiment of oscillating windmill of this invention.
Figure 2A:
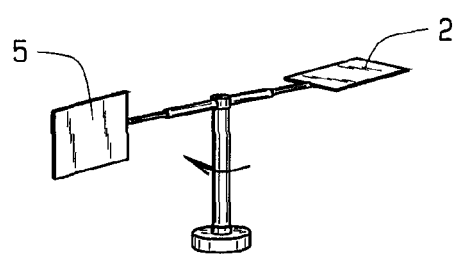
FIG. 2A-J illustrated the sequence of partial wind paddle rotations with alternating directions.
Figure 2F:
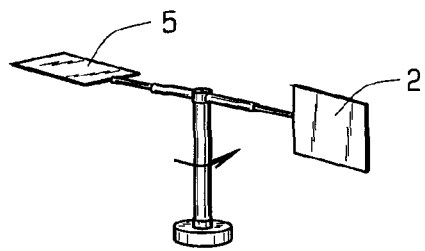
Figure 2B:
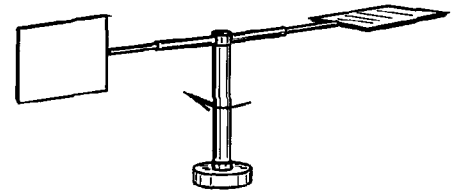
Figure 2G:
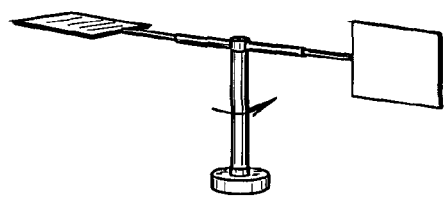
Figure 2C:
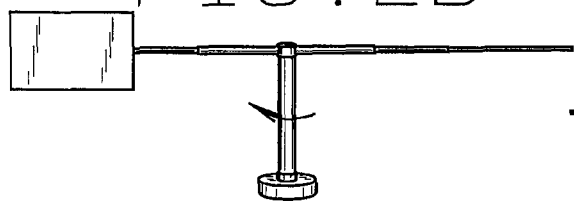
Figure 2H:
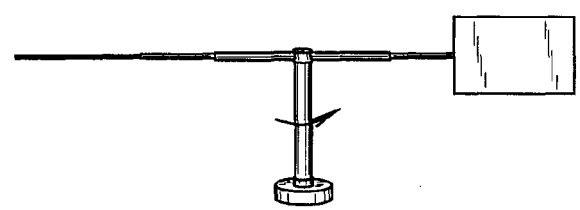
Figure 2D:
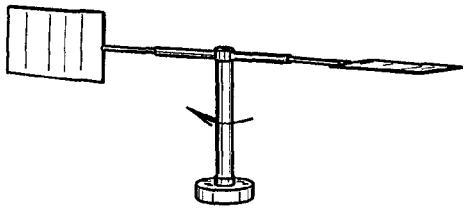
Figure 2I:
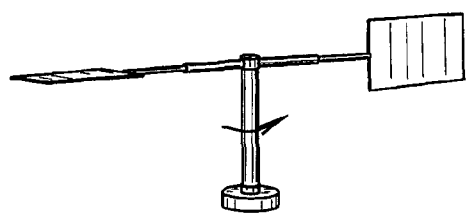
Figure 2E:
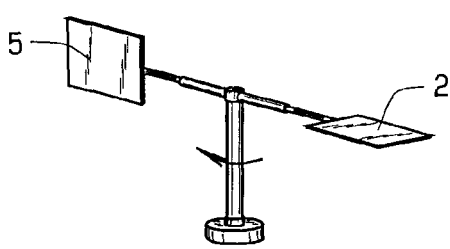
Figure 2J:
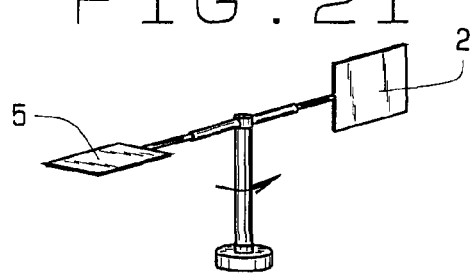

Referring now to FIG. 3 for a second embodiment, reference numeral 15 indicates a system in which two pairs of panels, an upper pair 18 and a lower pair 20, are connected to a shaft 22 through simple one-way clutches 24. In this embodiment, panels 25 and 28 are drive panels, and panels 26 and 27 are recovery panels, restoring the drive panels to driving position at the end of their travel in the drive position. This provides a relatively continuous rotation of a generator 40.

In this embodiment, shaft 22 passes through and is connected to a yaw control 36, and into a gear box 32 and mounted in a casing 38 by means of support 34. The casing 38 is sunk into the earth 39. The gear box 32 houses gears that multiply the rotational speed of the shaft 22 transmitted to a generator drive shaft 37 connected to the rotor of generator 40. The generator is electrically connected to transmit energy to a cable 35, which is part of an electrical grid. The generator acts as a brake, aiding the stopping of the panels. The energy transferred can be regulated electronically. The amount of rotation of the rods 29 and 30 is limited by stops not here shown, or a mechanical brake which can be a part of the gear box arrangement.

Figure 4:
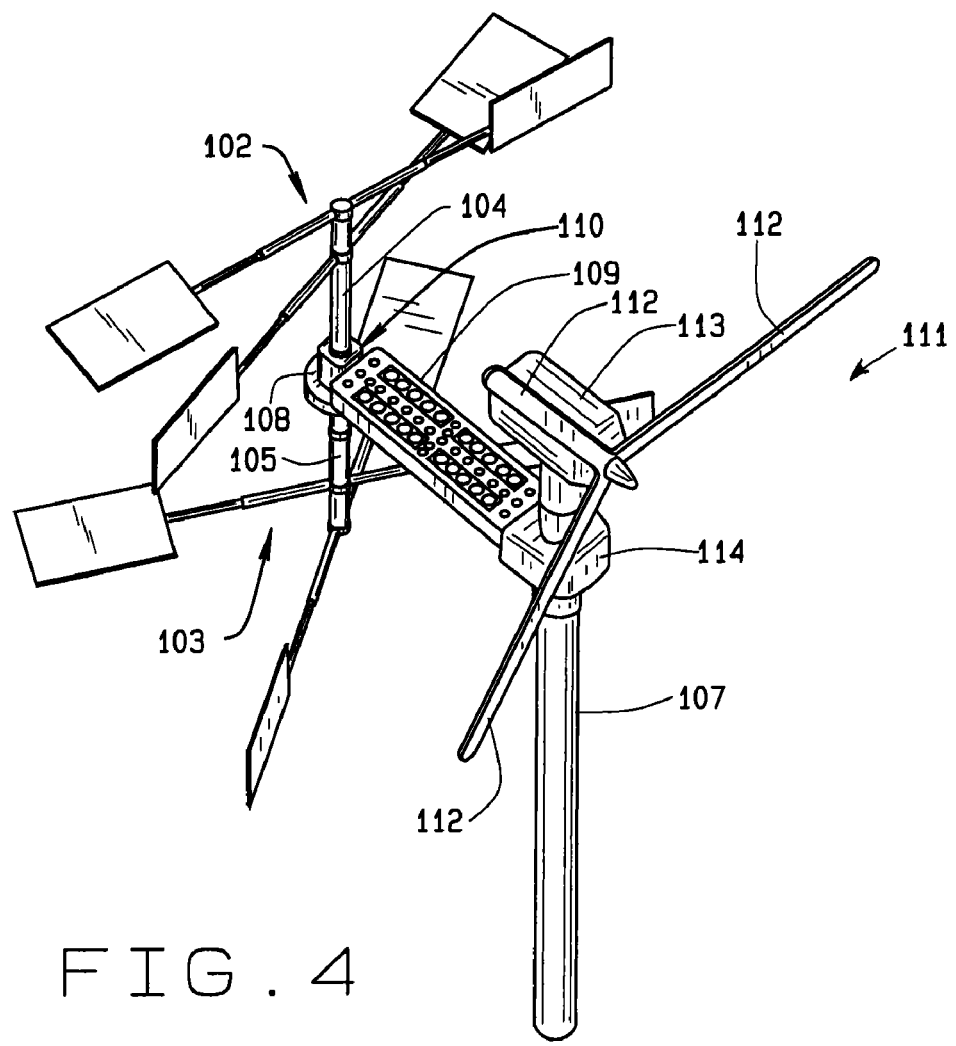
FIG. 4 is a third embodiment.

Referring now to FIG. 4, the panels of the second embodiment 111, here indicated by reference numerals 102 and 103, are mounted on a nacelle 113 which receives a shaft on which blades 112 are mounted. Blades 112 are aero-dynamically patterned to act as a lift type windmill. The entire assembly is supported by a tower 107. A bridge 109 connects the tower 107 with the nacelle. As can be seen in FIG. 4, the panels of the oscillating system are clear of the blades 112 by virtue of their limited travel. The oscillating wind panels serve as weather vanes, aiding the yaw control to keep the wind turbine and windmill headed into the wind. The panels 103 and 102 are mounted on shafts 104 and 105 which drive the generator 110 in housing 108, electrically connected to a generator 114 in the nacelle 113, hence to a power grid.

Figure 5:
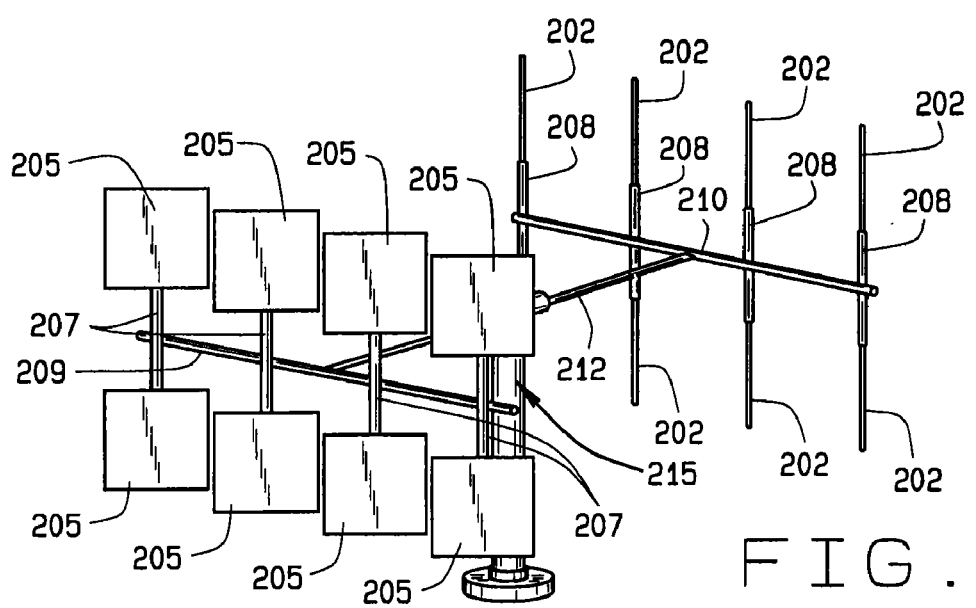
FIG. 5 is a fourth embodiment.

Referring now to FIG. 5, a third embodiment is shown, in which a multiplicity of panels 205 and 202 are mounted on vertical rods 207 and 208 respectively, in turn mounted on horizontal arms 209 and 210 respectively, carried by arms 212 connected to a shaft 215, connected to a generator. In this embodiment, the panels swivel about a vertical axis, but the net result is the same. Various arrangements of such paddles are shown in FIGS. 9 through 17 of my provisional application 60/866,127, incorporated herein by reference.

Figure 6A:
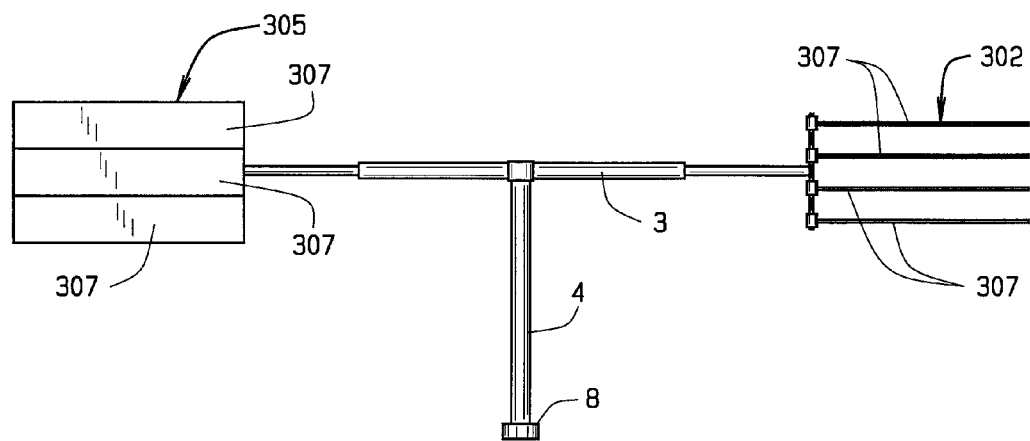
FIGS. 6A and 6B illustrate two conditions of a fifth embodiment.
Figure 6B:
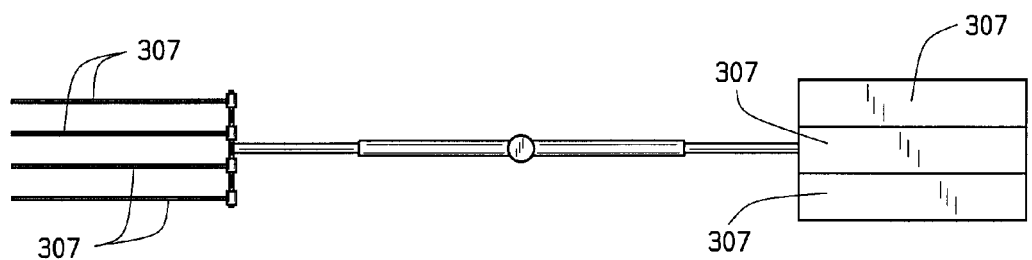
Figure 7A:
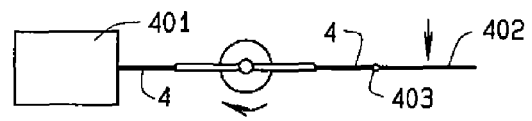
FIGS. 7A-O illustrate the sequence of partial wind panel rotations with alternating directions of a sixth embodiment.
Figure 7B:
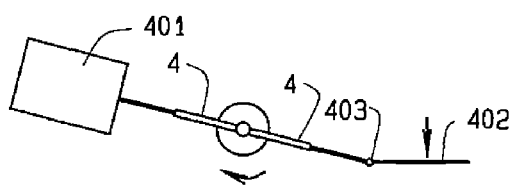
Figure 7C:
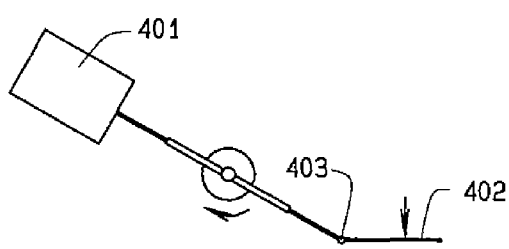
Figure 7D:
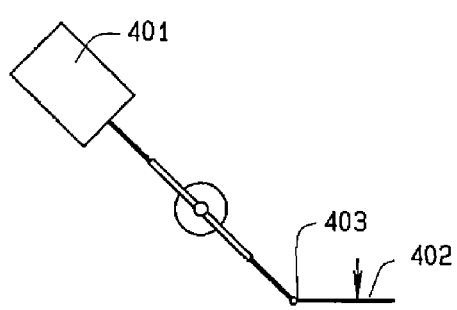
Figure 7E:
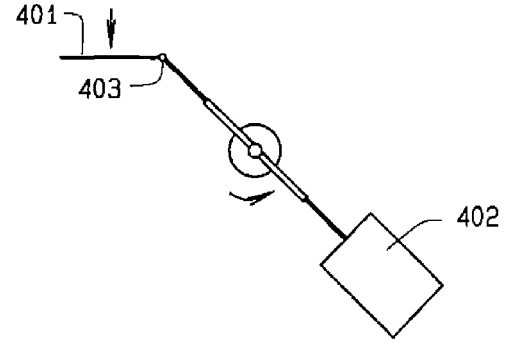
Figure 7F:
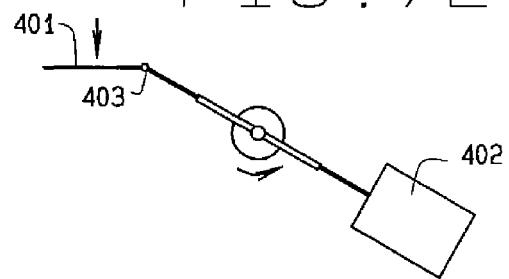
Figure 7G:
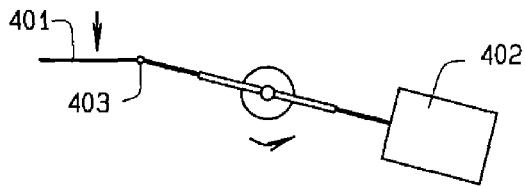
Figure 7H:
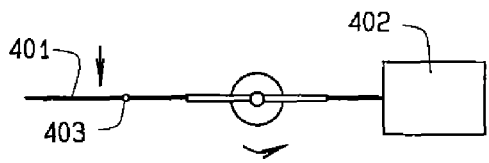
Figure 7I:
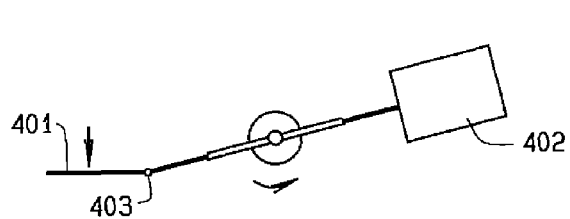
Figure 7L:
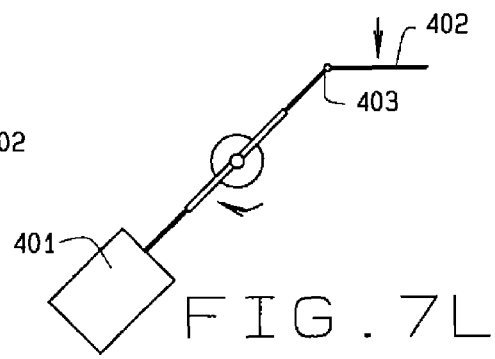
Figure 7J:
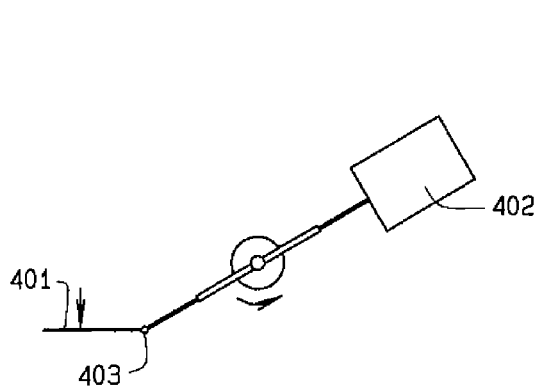
Figure 7M:
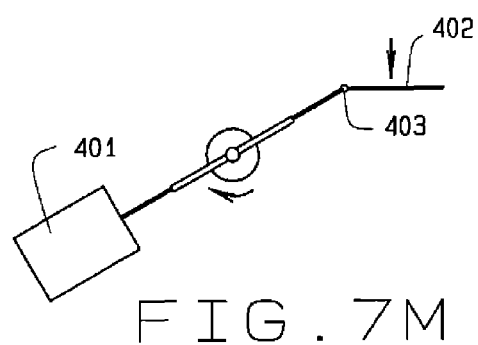
Figure 7N:
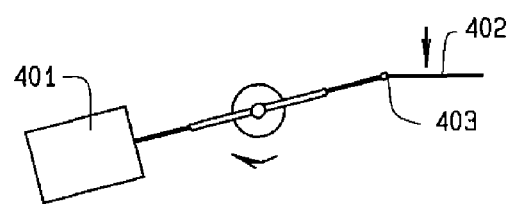
Figure 7K:
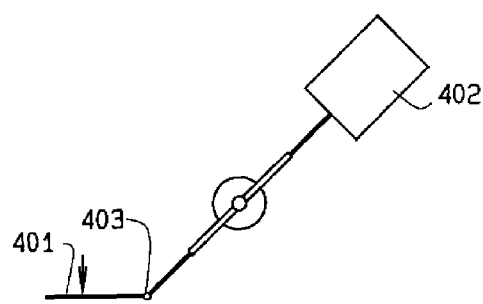
Figure 7O:
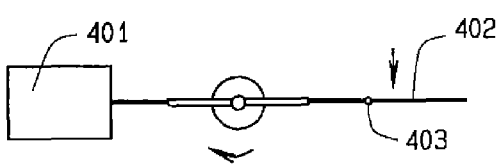

Referring now to FIGS. 6A and 6B, panels 302 and 305 are shown as being made up of slats 307, otherwise all as shown in FIG. 1. Clearly, similar shutter type panels can be used in the embodiment shown in FIG. 5.

Referring now to FIG. 7, the action of a hinge panel 401 is illustrated through one full cycle. A hinge 403 permits the panel to present a full face to the wind through its effective arc of travel.

Referring now to FIGS. 8A, B, and C, forces of the wind through a half cycle of the hinged version, the unhinged version, and an unhinged version of a panel with an outer edge wing or flap 504 are illustrated.

Figure 9:
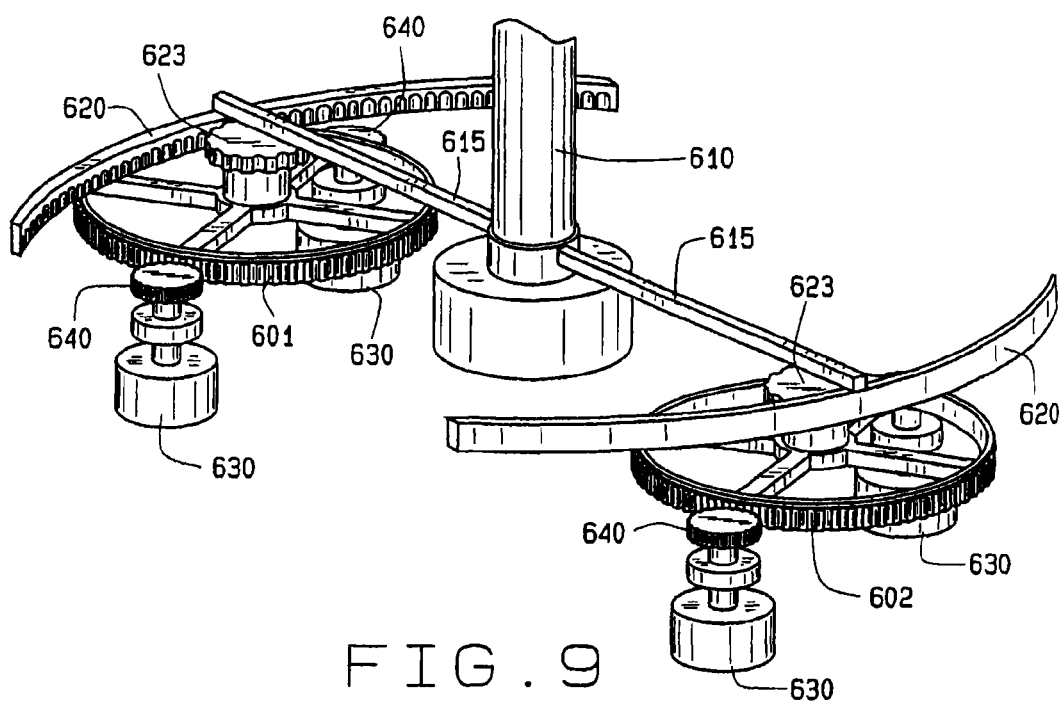
FIG. 9 is a view in perspective of a second form of generator arrangement from that illustrated in FIG. 3.

Referring now to FIG. 9, a system is shown in which a multiplicity, in this case four, generators are driven by gear wheels 601 and 602, in turn driven by a gear 623 engaged by a cog segment 620. The gears 623 are connected to drive the gear wheels 601 and 602, which in turn drive generators 630 by way of gears 640. The gear 623 is revolvably mounted on an arm 615 carried by a shaft 610 driven by the panels of any of the embodiments shown. As can readily be seen, the gearing arrangements of this embodiment multiply the motion of the shaft 610 to increase the speed of revolution of the rotor of the generator 630.

Figure 10:
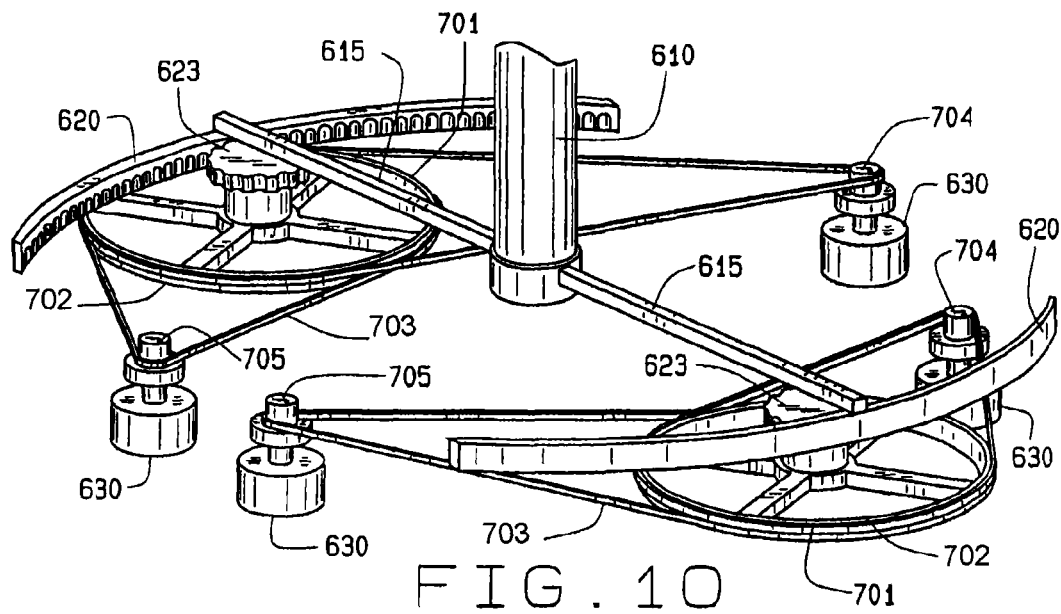
FIG. 10 is a fragmentary view in perspective of yet another system of generators to be operated by an oscillating windmill of this invention.
Figure 11A:
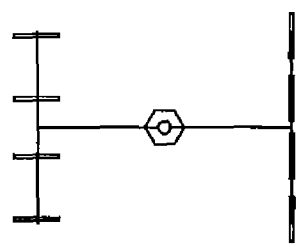
FIGS. 11A-11K are somewhat diagrammatic views in top plan, illustrating the sequence of partial wind panel rotations with alternating directions of yet another embodiment.
Figure 11B:
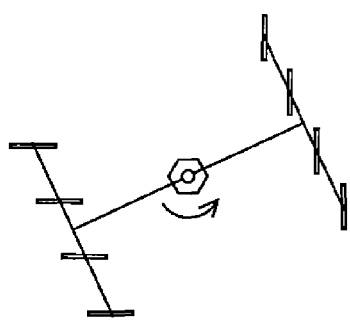
Figure 11C:
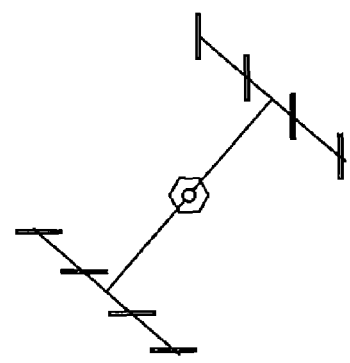
Figure 11D:
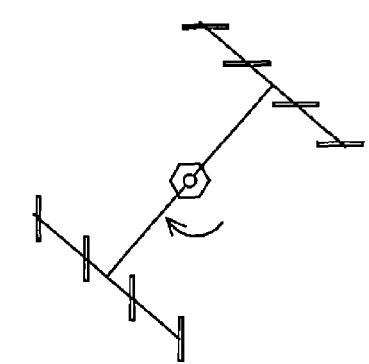
Figure 11E:
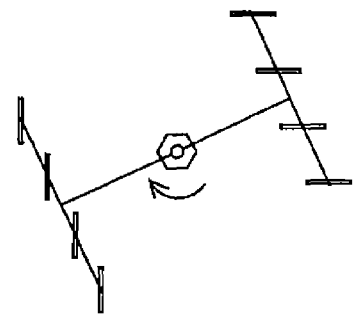
Figure 11F:
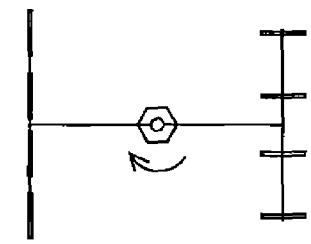
Figure 11G:
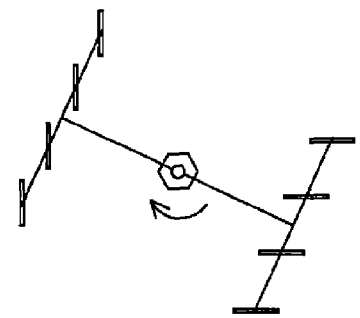
Figure 11H:
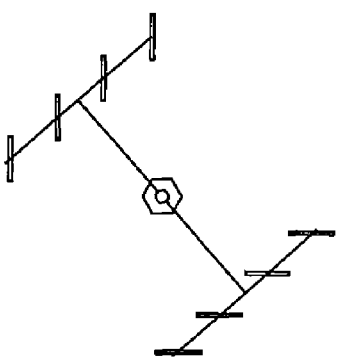
Figure 11I:
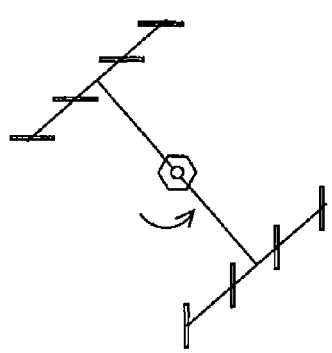
Figure 11J:
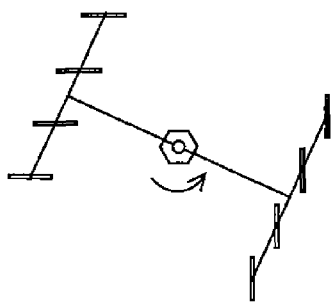
Figure 11K:
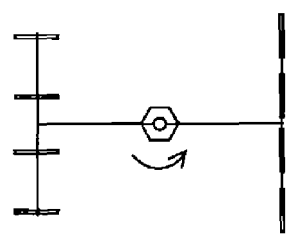

Referring now to FIG. 10, another multiple generator arrangement is shown. In this case, the gearing through the gear 623 is the same as that of FIG. 9. In this embodiment, the gears 623 drive sheaves 701, each of which carries two v-belts 702 and 703, obtaining around sheaves 704 and 705 of generator 630 to achieve the increased rate of revolution of the rotors of the generators 630.

Referring to FIG. 11, a hinge is shown between the rods 210 and 212 of the embodiment shown in FIG. 5, to avoid shielding of the panels during a part of their cycles.

Figure 12A:
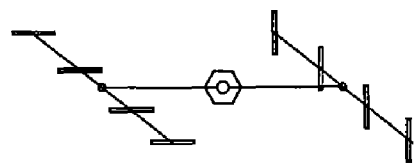
FIGS. 12A-12K are somewhat diagrammatic views in top plan of the sequence of wind panel rotations with alternating directions of the embodiment shown in FIGS. 11A-11K Corresponding reference numerals indicate corresponding parts throughout the several figures of the drawings.
Figure 12B:
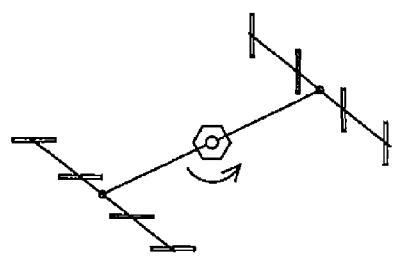
Figure 12C:
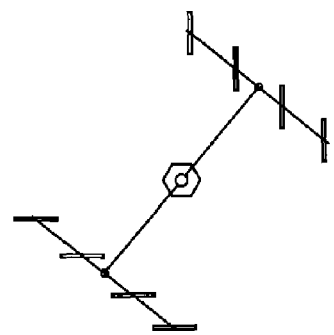
Figure 12D:
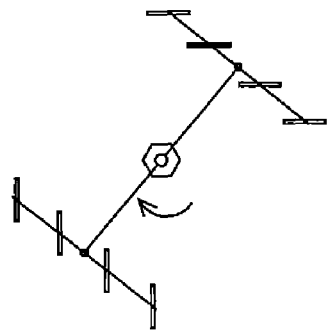
Figure 12:
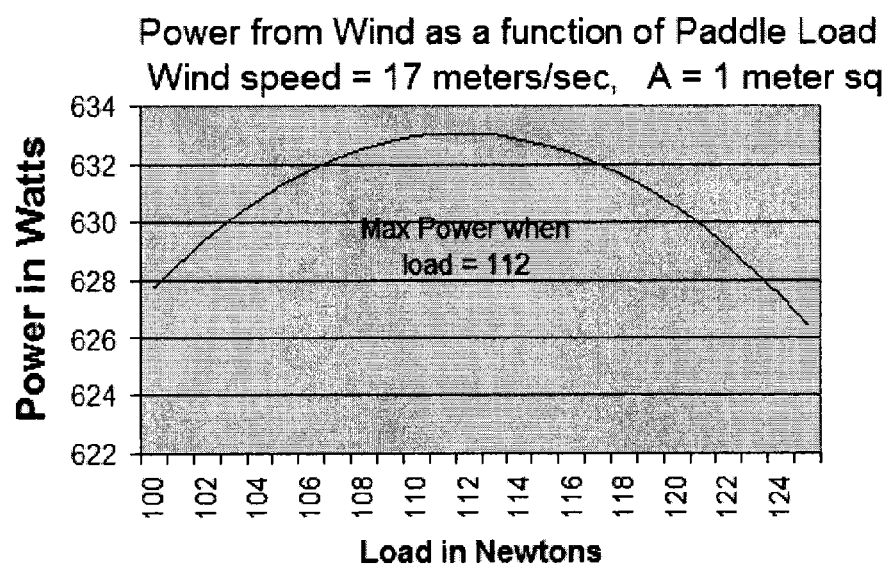
FIG. 12 ia a graph showing Power P in Watts as a function increasing load force in F in Newtons.
Figure 12E:
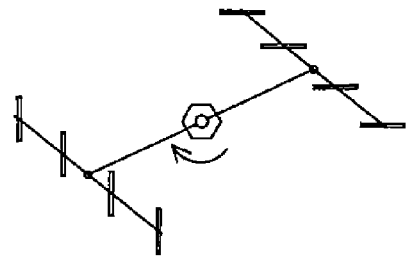
Figure 12I:
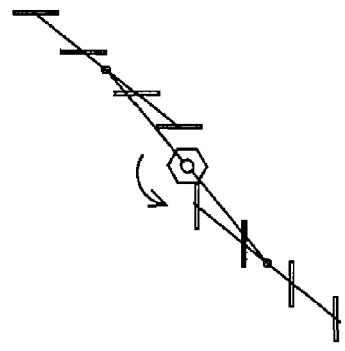
Figure 12F:
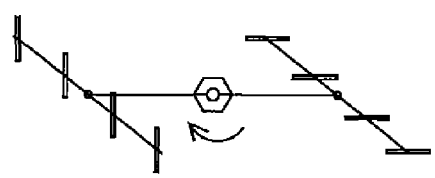
Figure 12G:
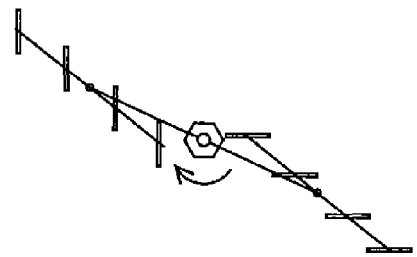
Figure 12J:
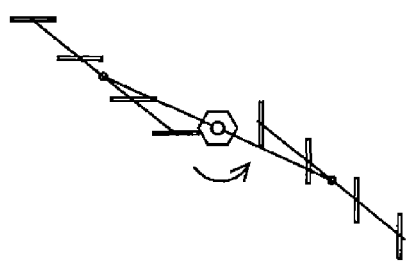
Figure 12H:
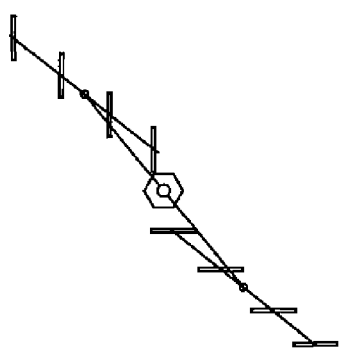
Figure 12K:
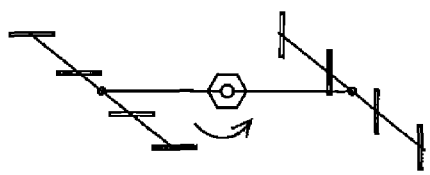

Various other arrangements of conventional windmills and wind turbines of this invention are illustrated in provisional application 60/947,049, incorporated herein by reference, see FIG. 12 of that application, for example.

Numerous variations in the construction and operating of the oscillating windmill of the invention in addition to those illustrated in and suggested by FIGS. 1-10 will occur to those skilled in the art in light of the foregoing disclosure. For example, the drive paddles of FIG. 3 can be made with larger areas than the recovery paddles or the rod can be made shorter on the recovery paddle side, or the rod can be made telescoping to accommodate different wind velocities. The stops to limit the amount of rotation of the paddle can be fixed to the support, to engage the rods as they rotate, or can take the form of a mechanical brake on the vertical shaft. The slatted types of paddles can be made with more or fewer slats than those shown in FIGS. 6A and 6B, and can be used in the vertically arranged panels of FIG. 5. These are merely illustrative.

The following discussion is intended to clarify the operation of the windmill of this invention as applied to the generation of electricity.

Performance of Oscillating Windmills

Oscillating windmills are similar to the conventional windmills in the sequential steps in which they extract the energy from wind and than convert it sequentially to different forms of mechanical energy. The final energy conversion is always from the rotational energy carried by high RPM shaft into the electrical energy.

There are corresponding losses associated with each energy conversion.

Wind Power

Wind power is a measure of the energy available in the wind. It is a function of the cube (third power) of the wind speed. If the wind speed is doubled, power in the wind increases by a factor of eight. This relationship means that small differences in wind speed lead to large differences in power.

Wind Power "Available"

The amount of power available in the wind is determined by the equation $P=\frac{1}{2}rAv^3$ Where: P=power, r=air density, A=cross-section of the measured wind stream, v=wind speed.

This equation states that the power is equal to one-half, times the air density, times the rotor area, times the cube of the wind speed. Air density varies according to elevation and temperature.

For the purposes of calculating wind power, the formula for air density is: $p=(1.325\times P)/T$ where T is the temperature in Fahrenheit+459.69 and P is the pressure in inches of Mercury adjusted for elevation.

Note: For comparison purposes, A=working paddle area whenever calculating the max wind power "available" to us to determine the Oscillating wind mill efficiency.

Whenever we talk about any comparison with a conventional windmill, we assume A to be the area swept by its rotor blades.

Energy Extraction from Wind Stream—Theory and General Case Betz' Law

Maximum wind energy extraction possible is limited by the Betz law which says that you can only convert less convert less than $^{16}/_{27}$ (or 59%) of the kinetic energy in the wind to mechanical energy using a wind turbine.

The calculations below will show that Oscillating Windmills' efficiency would typically be in the range of 20 to 24% but stay constant, regardless of wind speed (for a given Oscillating wind mill).

This is very different from the conventional wind mills where the efficiency is almost the same for any modern wind mill but is not constant for any given wind mill.

For example the efficiency of the GE 3.6 MegaWatt Wind Mill is about 18% at its rated wind speed of 16 meters/sec but fluctuates between 15% to 32% in the lower wind speeds.

The wind stream contains a linear kinetic energy well defined by physics equation above. The power harvested or extracted by Oscillating windmill by the square area of its working paddles determines its efficiency. The power harvested and converted into electricity (in Watts) is divided by the power available in wind (also in Watts).

Power extracted & converted, divided by Power available=Energy extraction efficiency $$\text{e.g. } \frac{P}{Pav} = \text{Efficiency of Wind energy extraction}$$

Case of Oscillating Windmills—Energy Extraction from Wind Stream

The Oscillating windmills "insert" their paddle(s) into a windstream and move and operate essentially in the same direction, albeit much more slowly than the wind.

The Oscillating windmills are thus driven by the wind drag force. The kinetic energy of wind molecules hitting the leveraged paddle(s) or panel surface(s) is translated into the movement of the paddles in the downwind direction.

These paddles thus "semi-rotate" in the horizontal plane. This semi-rotation is reversed back and forth to form a steady oscillation with preset amplitude value.

Amplitude:

The amplitude never exceeds 180 degrees and is typically preset at approximately 90 degrees, depending on the size or scale of the windmill.

After starting the windmill operation the computer control can adjust this oscillating amplitude to values significantly larger or smaller to optimize the operation for the constantly changing wind speed conditions.

Oscillating Wind Mills with hinged paddle implementation also tend to have larger oscillation amplitude than the non-hinged ones.

Optimal Paddle Speed:

It is shown below that the ideal paddle speed is exactly one third of the wind speed. The maximum electricity is always generated at that speed. (The paddle speed is controlled by the increasing and decreasing the electricity generating load).

Energy Conversion Steps with Corresponding Energy Conversion Losses

Just as in the case of the conventional windmills, the oscillating windmills first extract the linear kinetic mechanical energy of the linear wind stream into the rotationally oscillating mechanical energy with small RPM and high torque. Another mechanical energy conversion process converts this oscillating energy into the fully rotating mechanical energy with high RPM and lower torque rotation, the last energy conversion step is from mechanical to electrical energy. This step is based on Faraday law of induction and is essentially identical to the electricity generation of the conventional windmills described elsewhere in this patent.

Wind Energy → Paddle kinetic Energy →
100%−10% loss

Oscillation low RPM Energy → Hi RPM rotational Energy
90% left−3%                                   87% left Explanation of Energy Loss Estimates:

The losses of the first energy conversion are not shown. This is really an efficiency of energy extraction from wind. This energy extraction efficiency is approximately 22% and the calculations are shown below.

For the subsequent loss approximations, the starting point is the kinetic energy of the paddles which we call 100%. The 10% loss due to the oscillation is caused by the loss of leverage as the paddles move away from their "zero" positions.

The last energy conversion step generating electricity will have additional energy loss of 2% (heat loss) consistent with the industry standards.

Performance Optimization

Oscillating Wind mill concept presents several areas which lend themselves to the optimization of the mechanical Power and Energy extracted from the Power of the wind stream available to it.

These areas area:

1) Various Shapes of the paddles in working and non-working positions and Cd=drag coefficients associated with it. The goal is to use a cost-effective paddle with maximum Cd when in "working position" and the minimum Cd when in the non-working position. For our calculation below we chose Cd=1.42 which is a drag coefficient for paddles in working positions made as:

a) Flat rigid rectangular paddles with aspect ratio of 4:1 (laminar flat in non-working position)

b) Parachute-like circular sail "paddle" (will fold flat in non-working position)

2) Optimal Speed of the Paddles Relative to the Current Wind Speed.

Paddle speed is controlled by increasing and decreasing the Electricity generating Load for different Wind velocities. Power extracted (in Watts)=Fd times Vp Where: Fd=drag force (in Newtons) pushing the paddle and Vp=Velocity of the paddle (in meters/s) Fd in turn is defined by Drag equation as: $Fd=½rAv^2$
Where: P=power, r=air density, A=cross-section of the measured wind stream and v=velocity of the object relative to the fluid (wind). e.g. v=VT−Vp $$Fd=½rA(VT-Vp)^2$$

3) Optimal Load of Electricity Generation

The electricity generation produces a proportional "mechanical breaking" action which in turn determines to produce the optimal Paddle velocity.

This is essentially a mechanical breaking load on the paddles. This mechanical load is derived from the electrical load of generating a particular amount of electricity at any given time.

This is essentially the same as braking a hybrid car (extracting electrical energy from car's kinetic energy)

Our calculation below show how the Load determines the paddle speed for various wind speeds.

Optimum Paddle speed relative to the wind speed is crucial for the optimal electricity generation.

The maximum speed of the paddle is when there is no electricity generating load present. The only "load" on the paddle would be the frictional forces of its pivot and the paddle would move with the speed close to the current speed of wind. But such paddle movement would not be very useful, since no electricity could be generated without a mechanical load "felt" by the paddle.

The minimal speed of the paddle would be with very large loads. Such loads would bring the paddle to a complete stop and again no electricity could be generated without a movement.

The optimal speed of the paddle is somewhere between the max and min speeds described above. This speed can be determined by increasing or decreasing the load or counter-torque on the paddles by increasing or decreasing the electricity production. For example, such "Load increase" will effectively apply a braking action on the paddle movement thus slowing it down.

All this is related to the electricity generating load as shown in the calculations tabled below:

The highlighted column in Tables below shows the Power P (in Watts) generated by Paddle's Drag force Fd=Load (in Newtons) multiplied by Paddle velocity Vp (in meters/sec). Power=Energy per second The highlighted row in the Tables below show the optimal (ideal) values of Load Fd (drag force) and Paddle velocity Vp resulting in the maximum Power P.

P=*Vp (1 Watt=1 Newton*1 Meter/sec) Calculation of Load values to show the ideal loading e.g. optimal electricity generation First the Fd values will be calculated for fixed (constant) VT wind speeds; while varying the paddle Vp speed.

Using the Drag equation: $Fd=½rACd(VT-Vp)^2$ where $c_d$=1.42; r=the density of air=1.225 kg/m³; A=1 m²

| FD = 0.5 Cd r A (vT − vP)2 | | | | |
|---|---|---|---|---|
| Cd | 0.5 | Ro | A | |
| 1.42 | 0.5 | 1.225 | 1 | 0.86975 |

For constant Wind Velocity=10 meters/second

| Vt | Vp | Vt − Vp | squared | Cd * r * A | Fd | P = FD * Vp |
|---|---|---|---|---|---|---|
| 10 | 1 | 9 | 81 | 0.86975 | 70.45 | 70.450 |
| 10 | 2 | 8 | 64 | 0.86975 | 55.66 | 111.328 |
| 10 | 3 | 7 | 49 | 0.86975 | 42.62 | 127.853 |
| 10 | 4 | 6 | 36 | 0.86975 | 31.31 | 125.244 |
| 10 | 5 | 5 | 25 | 0.86975 | 21.74 | 108.719 |
| 10 | 6 | 4 | 16 | 0.86975 | 13.92 | 83.496 |
| 10 | 7 | 3 | 9 | 0.86975 | 7.83 | 54.794 |
| 10 | 8 | 2 | 4 | 0.86975 | 3.48 | 27.832 |
| 10 | 9 | 1 | 1 | 0.86975 | 0.87 | 7.828 |
| 10 | 10 | 0 | 0 | 0.86975 | 0.00 | 0.000 |

For constant Wind Velocity=15 meters/second

| Vt | Vp | Vt − Vp | squared | Cd * r * A | Fd | P = FD * Vp |
|---|---|---|---|---|---|---|
| 15 | 1 | 14 | 196 | 0.86975 | 170.47 | 170.471 |
| 15 | 2 | 13 | 169 | 0.86975 | 146.99 | 293.976 |
| 15 | 3 | 12 | 144 | 0.86975 | 125.24 | 375.732 |
| 15 | 4 | 11 | 121 | 0.86975 | 105.24 | 420.959 |
| 15 | 5 | 10 | 100 | 0.86975 | 86.98 | 434.875 |
| 15 | 6 | 9 | 81 | 0.86975 | 70.45 | 422.699 |
| 15 | 7 | 8 | 64 | 0.86975 | 55.66 | 389.648 |
| 15 | 8 | 7 | 49 | 0.86975 | 42.62 | 340.942 |
| 15 | 9 | 6 | 36 | 0.86975 | 31.31 | 281.799 |
| 15 | 10 | 5 | 25 | 0.86975 | 21.74 | 217.438 |
| 15 | 11 | 4 | 16 | 0.86975 | 13.92 | 153.076 |
| 15 | 12 | 3 | 9 | 0.86975 | 7.83 | 93.933 |
| 15 | 13 | 2 | 4 | 0.86975 | 3.48 | 45.227 |
| 15 | 14 | 1 | 1 | 0.86975 | 0.87 | 12.177 |
| 15 | 15 | 0 | 0 | 0.86975 | 0.00 | 0.000 |

For constant Wind Velocity=17 meters/second

| Vt | Vp | Vt − Vp | squared | Cd * r * A | Fd | P = FD * Vp |
|---|---|---|---|---|---|---|
| 17 | 1 | 16 | 256 | 0.86975 | 222.66 | 222.656 |
| 17 | 2 | 15 | 225 | 0.86975 | 195.69 | 391.388 |
| 17 | 3 | 14 | 196 | 0.86975 | 170.47 | 511.413 |
| 17 | 4 | 13 | 169 | 0.86975 | 146.99 | 587.951 |
| 17 | 5 | 12 | 144 | 0.86975 | 125.24 | 626.220 |
| 17 | 6 | 11 | 121 | 0.86975 | 105.24 | 631.439 |
| 17 | 7 | 10 | 100 | 0.86975 | 86.98 | 608.825 |
| 17 | 8 | 9 | 81 | 0.86975 | 70.45 | 563.598 |
| 17 | 9 | 8 | 64 | 0.86975 | 55.66 | 500.976 |
| 17 | 10 | 7 | 49 | 0.86975 | 42.62 | 426.178 |
| 17 | 11 | 6 | 36 | 0.86975 | 31.31 | 344.421 |
| 17 | 12 | 5 | 25 | 0.86975 | 21.74 | 260.925 |
| 17 | 13 | 4 | 16 | 0.86975 | 13.92 | 180.908 |
| 17 | 14 | 3 | 9 | 0.86975 | 7.83 | 109.589 |
| 17 | 15 | 2 | 4 | 0.86975 | 3.48 | 52.185 |
| 17 | 16 | 1 | 1 | 0.86975 | 0.87 | 13.916 |
| 17 | 17 | 0 | 0 | 0.86975 | 0.00 | 0.000 |

For constant Wind Velocity=19 meters/second

| Vt | Vp | Vt − Vp | squared | Cd * r * A | Fd | P = FD * Vp |
|---|---|---|---|---|---|---|
| 19 | 1 | 18 | 324 | 0.86975 | 281.80 | 281.799 |
| 19 | 2 | 17 | 289 | 0.86975 | 251.36 | 502.716 |
| 19 | 3 | 16 | 256 | 0.86975 | 222.66 | 667.968 |
| 19 | 4 | 15 | 225 | 0.86975 | 195.69 | 782.775 |
| 19 | 5 | 14 | 196 | 0.86975 | 170.47 | 852.355 |
| 19 | 6 | 13 | 169 | 0.86975 | 146.99 | 881.927 |
| 19 | 7 | 12 | 144 | 0.86975 | 125.24 | 876.708 |
| 19 | 8 | 11 | 121 | 0.86975 | 105.24 | 841.918 |
| 19 | 9 | 10 | 100 | 0.86975 | 86.98 | 782.775 |
| 19 | 10 | 9 | 81 | 0.86975 | 70.45 | 704.498 |
| 19 | 11 | 8 | 64 | 0.86975 | 55.66 | 612.304 |
| 19 | 12 | 7 | 49 | 0.86975 | 42.62 | 511.413 |
| 19 | 13 | 6 | 36 | 0.86975 | 31.31 | 407.043 |
| 19 | 14 | 5 | 25 | 0.86975 | 21.74 | 304.413 |
| 19 | 15 | 4 | 16 | 0.86975 | 13.92 | 208.740 |
| 19 | 16 | 3 | 9 | 0.86975 | 7.83 | 125.244 |
| 19 | 17 | 2 | 4 | 0.86975 | 3.48 | 59.143 |
| 19 | 18 | 1 | 1 | 0.86975 | 0.87 | 15.656 |
| 19 | 19 | 0 | 0 | 0.86975 | 0.00 | 0.000 |

The Tables above clearly show that the optimal load is when the paddle speed stabilizes at exactly one third of the current wind speed.

The Maximum Power is generated at that ratio Paddle vs Wind speed as calculated separately below:

| Vt | Vp = ⅓ Vt | Vt − Vp | squared | Cd * r * A | Fd Newton | P = FD * Vp Watts |
|---|---|---|---|---|---|---|
| 10 | 3.333 | 6.66667 | 44.444 | 0.86975 | 38.66 | 128.852 |
| 15 | 5 | 10 | 100 | 0.86975 | 86.98 | 434.875 |
| 17 | 5.667 | 11.3333 | 128.44 | 0.86975 | 111.71 | 633.049 |
| 19 | 6.333 | 12.6667 | 160.44 | 0.86975 | 139.55 | 883.795 |

These calculations are independently confirmed by several tables of calculations on the following pages.

These extensive calculations in the tables below were done by using the Drag Machine calculator publicly available on the Danish government site www.windpower.org; Specifically: http://www.windpower.orq/en/tour/wtrb/dragrace.htm The Drag machine analogy is valid only up to the first energy conversion e.g. wind energy into the mechanical energy "harvested" by the Oscillating wind mill paddles.

The further energy conversion will be essentially losses and will be calculated below by different methods.

Ideal Loading

It is also useful to plot the Power as a function of loading which is shown in FIG. 12. The Wind speed of 17 meters/sec was chosen but the graph would look similar for all other speeds.

Power P in Watts as a Function of Increasing Load Force F in Newtons.

For constant Wind Speed=19 meters/sec; drag coeff.=1.42

Paddle or Sail area=1 meter square (1 meter×1 meter);

Optimal Load=140 Newtons resulting in maximum power P=883.79 Watts

Optimal electricity generating load results in Optimal Paddle speed of 6.31 meter/sec !! Operational paddle speed for optimal load is always ⅓ of wind speed=$\lambda$=0.333 !!

| F = Load Force in Newtons | $C_D$ = constant drag coef. | $V_T$ = constant Wind speed | $V_P$ = Paddle (or Sail) speed | $\lambda$ = Vp/Vt | P = Power In Watts | $C_P$ = Power efficiency coef. |
|---|---|---|---|---|---|---|
| 130.00 | 1.42 | 19.00 | 6.77 | 0.36 | 880.66 | 0.21 |
| 131.00 | 1.42 | 19.00 | 6.73 | 0.35 | 881.28 | 0.21 |
| 132.00 | 1.42 | 19.00 | 6.68 | 0.35 | 881.84 | 0.21 |
| 133.00 | 1.42 | 19.00 | 6.63 | 0.35 | 882.32 | 0.21 |
| 134.00 | 1.42 | 19.00 | 6.59 | 0.35 | 882.74 | 0.21 |
| 135.00 | 1.42 | 19.00 | 6.54 | 0.34 | 883.09 | 0.21 |
| 136.00 | 1.42 | 19.00 | 6.50 | 0.34 | 883.36 | 0.21 |
| 137.00 | 1.42 | 19.00 | 6.45 | 0.34 | 883.57 | 0.21 |
| 138.00 | 1.42 | 19.00 | 6.40 | 0.34 | 883.71 | 0.21 |
| 139.00 | 1.42 | 19.00 | 6.36 | 0.33 | 883.78 | 0.21 |
| 140.00 | 1.42 | 19.00 | 6.31 | 0.33 | 883.79 | 0.21 |
| 141.00 | 1.42 | 19.00 | 6.27 | 0.33 | 883.72 | 0.21 |
| 142.00 | 1.42 | 19.00 | 6.22 | 0.33 | 883.59 | 0.21 |
| 143.00 | 1.42 | 19.00 | 6.18 | 0.33 | 883.39 | 0.21 |
| 144.00 | 1.42 | 19.00 | 6.13 | 0.32 | 883.12 | 0.21 |
| 145.00 | 1.42 | 19.00 | 6.09 | 0.32 | 882.79 | 0.21 |
| 146.00 | 1.42 | 19.00 | 6.04 | 0.32 | 882.39 | 0.21 |
| 147.00 | 1.42 | 19.00 | 6.00 | 0.32 | 881.92 | 0.21 |
| 148.00 | 1.42 | 19.00 | 5.96 | 0.31 | 881.39 | 0.21 |
| 149.00 | 1.42 | 19.00 | 5.91 | 0.31 | 880.79 | 0.21 |
| 150.00 | 1.42 | 19.00 | 5.87 | 0.31 | 880.12 | 0.21 |

$c_P$ = share of the power of the wind, which the machine is able to convert into mechanical power.

$\lambda$ = Vp/Vt = ratio of variable paddle speed Vp over the constant wind speed Vt . . . Vt always >Vp.

Power P in Watts as a Function of Increasing Load Force F in Newtons.

For constant Wind Speed=10 meters/sec; drag coeff.=1.42
Paddle or Sail area=1 meter square (1 meter×1 meter);
Optimal Load=39 Newtons resulting in maximum power P=128.84 Watts Optimal electricity generating load results in Optimal Paddle speed of 3.30 meter/sec !! Operational paddle speed for optimal load is always ⅓ of wind speed=λ=0.333 !!

| F = Load Force in Newtons | $c_D$ = constant drag coef. | $V_T$ = constant Wind speed | $V_P$ = Paddle (or Sail) speed | λ = Vp/Vt | P = Power In Watts | $c_P$ = Power efficiency coef. |
|---|---|---|---|---|---|---|
| 100.00 | 1.42 | 17.00 | 6.28 | 0.37 | 627.73 | 0.21 |
| 101.00 | 1.42 | 17.00 | 6.22 | 0.37 | 628.61 | 0.21 |
| 102.00 | 1.42 | 17.00 | 6.17 | 0.36 | 629.41 | 0.21 |
| 103.00 | 1.42 | 17.00 | 6.12 | 0.36 | 630.12 | 0.21 |
| 104.00 | 1.42 | 17.00 | 6.06 | 0.36 | 630.76 | 0.21 |
| 105.00 | 1.42 | 17.00 | 6.01 | 0.35 | 631.32 | 0.21 |
| 106.00 | 1.42 | 17.00 | 5.96 | 0.35 | 631.80 | 0.21 |
| 107.00 | 1.42 | 17.00 | 5.91 | 0.35 | 632.20 | 0.21 |
| 108.00 | 1.42 | 17.00 | 5.86 | 0.34 | 632.52 | 0.21 |
| 109.00 | 1.42 | 17.00 | 5.81 | 0.34 | 632.77 | 0.21 |
| 110.00 | 1.42 | 17.00 | 5.75 | 0.34 | 632.94 | 0.21 |
| 111.00 | 1.42 | 17.00 | 5.70 | 0.34 | 633.03 | 0.21 |
| 112.00 | 1.42 | 17.00 | 5.65 | 0.33 | 633.05 | 0.21 |
| 113.00 | 1.42 | 17.00 | 5.60 | 0.33 | 632.99 | 0.21 |
| 114.00 | 1.42 | 17.00 | 5.55 | 0.33 | 632.85 | 0.21 |
| 115.00 | 1.42 | 17.00 | 5.50 | 0.32 | 632.64 | 0.21 |
| 116.00 | 1.42 | 17.00 | 5.45 | 0.32 | 632.35 | 0.21 |
| 117.00 | 1.42 | 17.00 | 5.40 | 0.32 | 631.99 | 0.21 |
| 118.00 | 1.42 | 17.00 | 5.35 | 0.31 | 631.56 | 0.21 |
| 119.00 | 1.42 | 17.00 | 5.30 | 0.31 | 631.05 | 0.21 |
| 120.00 | 1.42 | 17.00 | 5.25 | 0.31 | 630.47 | 0.21 |
| 121.00 | 1.42 | 17.00 | 5.21 | 0.31 | 629.81 | 0.21 |
| 122.00 | 1.42 | 17.00 | 5.16 | 0.30 | 629.08 | 0.21 |
| 123.00 | 1.42 | 17.00 | 5.11 | 0.30 | 628.28 | 0.21 |
| 124.00 | 1.42 | 17.00 | 5.06 | 0.30 | 627.41 | 0.21 |
| 125.00 | 1.42 | 17.00 | 5.01 | 0.29 | 626.46 | 0.21 |

$c_P$ = share of the power of the wind, which the machine is able to convert into mechanical power.
λ = Vp/Vt = ratio of variable paddle speed Vp over the constant wind speed Vt ... Vt always > Vp.

Power P in Watts as a Function of Increasing Load Force F in Newtons.

For constant Wind Speed=15 meters/sec; drag coeff.=1.42
Paddle or Sail area=1 meter square (1 meter×1 meter);
Optimal Load=87 Newtons resulting in maximum power P=434.87 Watts Optimal electricity generating load results in Optimal Paddle speed of 5.00 meter/sec Operational paddle speed for optimal load is always ⅓ of wind speed=λ=0.333

| F = Load Force in Newtons | $c_D$ = constant drag coef. | $V_T$ = constant Wind speed | $V_P$ = Paddle (or Sail) speed | λ = Vp/Vt | P = Power In Watts | $c_P$ = Power efficiency coef. |
|---|---|---|---|---|---|---|
| 79.00 | 1.42 | 15.00 | 5.47 | 0.36 | 432.09 | 0.21 |
| 80.00 | 1.42 | 15.00 | 5.41 | 0.36 | 432.75 | 0.21 |
| 81.00 | 1.42 | 15.00 | 5.35 | 0.36 | 433.32 | 0.21 |
| 82.00 | 1.42 | 15.00 | 5.29 | 0.35 | 433.80 | 0.21 |
| 83.00 | 1.42 | 15.00 | 5.23 | 0.35 | 434.19 | 0.21 |
| 84.00 | 1.42 | 15.00 | 5.17 | 0.34 | 434.49 | 0.21 |
| 85.00 | 1.42 | 15.00 | 5.11 | 0.34 | 434.71 | 0.21 |
| 86.00 | 1.42 | 15.00 | 5.06 | 0.34 | 434.83 | 0.21 |
| 87.00 | 1.42 | 15.00 | 5.00 | 0.33 | 434.87 | 0.21 |
| 88.00 | 1.42 | 15.00 | 4.94 | 0.33 | 434.83 | 0.21 |
| 89.00 | 1.42 | 15.00 | 4.88 | 0.33 | 434.70 | 0.21 |
| 90.00 | 1.42 | 15.00 | 4.83 | 0.32 | 434.48 | 0.21 |
| 91.00 | 1.42 | 15.00 | 4.77 | 0.32 | 434.18 | 0.21 |
| 92.00 | 1.42 | 15.00 | 4.72 | 0.31 | 433.80 | 0.21 |
| 93.00 | 1.42 | 15.00 | 4.66 | 0.31 | 433.33 | 0.21 |
| 94.00 | 1.42 | 15.00 | 4.60 | 0.31 | 432.78 | 0.21 |
| 95.00 | 1.42 | 15.00 | 4.55 | 0.30 | 432.14 | 0.21 |

$c_P$ = share of the power of the wind, which the machine is able to convert into mechanical power.
λ = Vp/Vt = ratio of variable paddle speed Vp over the constant wind speed Vt ... Vt always > Vp.

Power P in Watts as a Function of Increasing Load Force F in Newtons.

For constant Wind Speed=10 meters/sec; drag coeff.=1.42
Paddle or Sail area=1 meter square (1 meter×1 meter);
Optimal Load=39 Newtons resulting in maximum power P=128.84 Watts Optimal electricity generating load results in Optimal Paddle speed of 3.30 meter/sec Operational paddle speed for optimal load is always ⅓ of wind speed=λ=0.333

| F = Load Force in Newtons | $c_D$ = constant drag coef. | $V_T$ = constant Wind speed | $V_P$ = Paddle (or Sail) speed | $\lambda$ = Vp/Vt | P = Power In Watts | $c_P$ = Power efficiency coef. |
|---|---|---|---|---|---|---|
| 32.00 | 1.42 | 10.00 | 3.93 | 0.39 | 125.90 | 0.21 |
| 33.00 | 1.42 | 10.00 | 3.84 | 0.38 | 126.73 | 0.21 |
| 34.00 | 1.42 | 10.00 | 3.75 | 0.37 | 127.42 | 0.21 |
| 35.00 | 1.42 | 10.00 | 3.66 | 0.37 | 127.97 | 0.21 |
| 36.00 | 1.42 | 10.00 | 3.57 | 0.36 | 128.39 | 0.21 |
| 37.00 | 1.42 | 10.00 | 3.48 | 0.35 | 128.67 | 0.21 |
| 38.00 | 1.42 | 10.00 | 3.39 | 0.34 | 128.82 | 0.21 |
| 39.00 | 1.42 | 10.00 | 3.30 | 0.33 | 128.84 | 0.21 |
| 40.00 | 1.42 | 10.00 | 3.22 | 0.32 | 128.74 | 0.21 |
| 41.00 | 1.42 | 10.00 | 3.13 | 0.31 | 128.50 | 0.21 |
| 42.00 | 1.42 | 10.00 | 3.05 | 0.31 | 128.14 | 0.21 |
| 43.00 | 1.42 | 10.00 | 2.97 | 0.30 | 127.65 | 0.21 |
| 44.00 | 1.42 | 10.00 | 2.89 | 0.29 | 127.05 | 0.21 |
| 45.00 | 1.42 | 10.00 | 2.81 | 0.28 | 126.32 | 0.21 |
| 46.00 | 1.42 | 10.00 | 2.73 | 0.27 | 125.47 | 0.20 |
| 47.00 | 1.42 | 10.00 | 2.65 | 0.26 | 124.50 | 0.20 |
| 48.00 | 1.42 | 10.00 | 2.57 | 0.26 | 123.41 | 0.20 |

$c_P$ = share of the power of the wind, which the machine is able to convert into mechanical power.
$\lambda$ = Vp/Vt = ratio of variable paddle speed Vp over the constant wind speed Vt . . . Vt always > Vp.

Power is energy transfer per unit of time. Power may be measured at any point in time, whereas energy has to be measured during a certain period, e.g. a second, an hour, or a year.

If a wind turbine has a rated power or nameplate power of 1000 kW, that tells you that the wind turbine will produce 1000 kilowatt hours (kWh) of energy per hour of operation, when running at its maximum performance (i.e. at high winds above, say, 15 metres per second (m/s)).

Summary for All Wind Speeds
For Cd=1.42 which is a drag coeff of hollow semi-sphere or A flat plate rectangle=1 meter square with approx 4:1 aspect ratio
Power is in Watts/1 Meter sq of Working Area
Wind speed=3 meters per second
Max Power=3.48 Watts/1 meter sq of working area
Wind speed=4 meters per second
Max Power=8.24 Watts//1 meter sq of working area
Wind speed=5 meters per second
Max Power=16.09 Watts/1 meter sq of working area
Wind speed=6 meters per second
Max Power=27.83 Watts/1 meter sq
Wind speed=7 meters per second
Max Power=44.20 Watts/1 meter sq of working area
Wind speed=8 meters per second
Max Power=65.97 Watts/1 meter sq of working area
Wind speed=9 meters per second
Max Power=93.93 Watts/1 meter sq of working area
Wind speed=10 meters per second
Max Power=128.84 Watts/1 meter sq
Wind speed=11 meters per second
Max Power=171.50 Watts/1 meter sq
Wind speed=12 meters per second
Max Power=222.65 Watts/1 meter sq
Wind speed=13 meters per second
Max Power=283.08 Watts/1 meter sq
Wind speed=14 meters per second
Max Power=353.57 Wafts/1 meter sq
Wind speed=15 meters per second
Max Power=434.87 Watts/1 meter sq
Wind speed=16 meters per second
Max Power=527.78 Watts/1 meter sq
Wind speed=17 meters per second
Max Power=633.05 Watts/1 meter sq
Wind speed=18 meters per second
Max Power=751.46 Watts/1 meter sq
Wind speed=19 meters per second
Max Power=883.79 Watts/1 meter sq
Wind speed=20 meters per second
Max Power=1,030.81 Watts/1 meter sq
Wind speed=21 meters per second
Max Power=1193.29 Wafts/1 meter sq
Wind speed=22 meters per second
Max Power=1,372.01 Watts/1 meter sq
Wind speed=23 meters per second
Max Power=1567.73 Watts/1 meter sq
Wind speed=24 meters per second
Max Power=1,781.24 Watts/1 meter sq
Wind speed=25 meters per second
Max Power=2013.31 Watts/1 meter sq
Wind speed=26 meters per second
Max Power=2264.70 Watts/1 meter sq
Wind speed=27 meters per second
Max Power=2536.19 Watts/1 meter sq
The Power Curve of Oscillating Wind Mill The summary of maximum numbers for various speeds shown on the preceding page above could be plotted to form a power curve for the Oscillating Wind Mill with the working surface of only 1 meter square.

Multiplying these Watt numbers by 1,000 would result in numbers in Kilowatts.

These would correspond to the Oscillating wind mill with thousand times greater paddle work surface.

Instead of 1 meter square, it would be 1,000 meter square corresponding for example to the wind mill with 10 working paddles on each side stacked in the "horizontal architecture".

Each paddle would be a rectangle with horizontal side=5 meters and vertical side of 20 meters.

The surface of each paddle would be 100 meters square. 10 paddles=1,000 meter sq. working total.

Such Oscillating Wind mill would be rated at 633 KiloWatt at wind speed of 17 meters/sec The power curve of such Oscillating wind mill would not include the losses from the subsequent energy conversions described below and estimated at about 13%.

Neither it would include the small counter-torque losses caused by paddles in non-working positions.

Since such non-working positions are highly aerodynamic with additional small profile, these counter-torque losses should not approach 2%.

So the total losses are estimated not to exceed 15% from the calculations above.

But these calculations would automatically increase by 15% if we increase the paddle drag coefficient used in these calculations by 15%. Such increase from Cd=1.41 to lets say Cd=1.6 would enable us to make the fair comparison of numbers above with the industry power curves for the conventional wind mills.

Energy Conversion Losses Associated with Each Conversion Step.

Just as in the case of the conventional windmills, the oscillating windmills first extract the linear kinetic mechanical energy of the linear wind stream into the rotationally oscillating mechanical energy with small RPM and high torque.

1) Oscillating Loss:

The loss here is due to physics e.g. loss of leverage as the paddle rotates away from the plane perpendicular to the wind stream. Such loss is a function of the pre-set Amplitude.

Our calculations show it to be around 9% for the Oscillations of −45 to +45 degrees from the mid-position where the paddle is also perpendicular to the wind stream regardless of whether it is or it is not "hinged".

For non-hinged paddles there is an additional loss during the oscillation due to the sinusoidal loss of the drag force, as paddles become more and more angled to the wind direction.

2) Loss from Low RPM Oscillation to High RPM Rotations

Another mechanical energy conversion process converts this oscillating energy into the fully rotating mechanical energy with high RPM and lower torque rotation.

Loss here is estimated to be approximately 3% depending on the actual conversion mechanism used.

3) Loss from Mechanical to Electrical Energy Generation

The last energy conversion step is from mechanical to electrical energy. This step is based on Faraday law of induction and is essentially identical to the electricity generation of the conventional windmills described elsewhere in this patent. We estimate 2% loss consistent with the industry generators.

Wind Energy → Paddle kinetic Energy →
100%−10% loss
Oscillation low RPM Energy → Hi RPM rotational Energy
90% left−3%　　　　　　　　　　　87% left

The invention claimed is:

1. An oscillating wind paddle assembly comprising an upper pair of paddles moved between a first position at right angles to the direction of wind and a second position parallel to the direction of wind, and mounted on arms extending to either side of a shaft to which they are connected through a one-way clutch, one of said paddles being a drive paddle and the other a recovery paddle and a lower pair of paddles moved between a first position at right angles to the direction of wind and a second position parallel to the direction of wind and mounted on arms extending to either side of said shaft to which they are connected through a one-way clutch, one of said paddles being a drive paddle and the other a recovery paddle, said upper and lower paddles being about 180° out of phase, said shaft being operatively connected to a generator.

2. The oscillating windmill of claim 1 wherein said paddles are hinged so as alternately always to present a surface perpendicular to the direction of wind impinging on one of said paddles.

3. The oscillating wind panel assembly of claim 1 wherein said paddles have an upwardly turned flap along an outer edge, said flap being on the order of 45 degrees from the rest of the paddle.

4. An oscillating windmill of claim 1 including a cog wheel segment carried by each of said arms, said cog wheel segment meshing with a drive gear operatively connected to said generator.

5. The combination of claim 4 wherein the oscillating paddles are hinged.

6. The combination of claim 4 wherein the paddles have an upwardly turned flap along their outer edge.

7. The combination of claim 4 wherein the drive gear is connected to a cog wheel of larger diameter than the drive gear and said cog wheel meshes with a generator gear of smaller diameter, said generator gear being coupled through a clutch to said generator.

8. The combination of claim 4 wherein the drive gear is connected to a drive sheave of larger diameter than the drive gear, and said drive sheave carries a belt or chain connected to a sheave of smaller diameter connected to drive said generator.

9. In combination with a windmill of the lift type rotating about a substantially horizontal axis and mounted on a tower, an oscillating wind paddle of the drag type mounted for rotation through less than 180° on a substantially vertical shaft and rotating said shaft through said less than 180° at a pass, said shaft being supported by said tower and positioned leeward from said windmill of the lift type, and said shaft being operatively connected to a generator.

10. The combination of claim 9 wherein the oscillating paddle comprises two arms extending in opposite directions from said vertical axis, and provided with paddles moved from vertical wind catching position to substantially horizontal position alternately on the two arms.

11. The combination of claim 10 wherein the arms rotate on the order of 120°.

12. The combination of claim 9 wherein the wind paddle comprises a plurality of pairs of arms mounted for rotation about a common vertical axis and spaced vertically from one another.

13. An oscillating windmill comprising a vertical shaft operatively connected to a generator, two opposed arms carried by said shaft, a cog wheel segment carried by each of said arms, said cog wheel segment meshing with a drive gear operatively connected to said generator, and paddles mounted on ends of said arms, said paddles moving alternately between a position substantially at right angles to the direction of wind and a position parallel to the direction of said wind, the paddle at the end of one said arm being 90° out of phase with the paddle at the end of the other said arm, travel of said arms being limited to less than 180°.

14. The combination of claim 13 wherein the oscillating paddles are hinged.

15. The combination of claim 13 wherein the paddles have an upwardly turned flap along their outer edge.

16. The combination of claim 13 wherein the drive gear is connected to a cog wheel of larger diameter than the drive gear and said cog wheel meshes with a generator gear of smaller diameter, said generator gear being coupled through a clutch to said generator.

17. The combination of claim 13 wherein the drive gear is connected to a drive sheave of larger diameter than the drive gear, and said drive sheave carries a belt or chain connected to a sheave of smaller diameter connected to drive said generator.

* * * * *